(12) United States Patent
Nam (10) Patent No.: US 10,962,290 B2
(45) Date of Patent: Mar. 30, 2021

(54) HIGH-EFFICIENCY AIR WATER SYSTEM FOR TROPICAL CLIMATE

(71) Applicant: AIR WATER KOREA CO., LTD., Gwangju (KR)

(72) Inventor: Jae Il Nam, Gwangju (KR)

(73) Assignee: AIR WATER KOREA CO., LTD., Gwangju (KR)

( * ) Notice: Subject to any disclaimer, the term of this patent is extended or adjusted under 35 U.S.C. 154(b) by 64 days.

(21) Appl. No.: 16/309,085

(22) PCT Filed: Dec. 7, 2016

(86) PCT No.: PCT/KR2016/014315
§ 371 (c)(1),
(2) Date: Dec. 11, 2018

(87) PCT Pub. No.: WO2018/008815
PCT Pub. Date: Jan. 11, 2018

(65) Prior Publication Data
US 2019/0310021 A1    Oct. 10, 2019

(30) Foreign Application Priority Data

Jul. 8, 2016    (KR) .................. 10-2016-0086648

(51) Int. Cl.
*F28B 9/08*    (2006.01)
*F24F 6/02*    (2006.01)
(Continued)

(52) U.S. Cl.
CPC ................ *F28B 9/08* (2013.01); *B01D 50/00* (2013.01); *F24F 6/043* (2013.01); *F25B 39/02* (2013.01);
(Continued)

(58) Field of Classification Search
CPC .. F24F 6/043; F24F 6/02; F25B 39/02; B01D 50/00
See application file for complete search history.

(56) References Cited

U.S. PATENT DOCUMENTS 5,106,512 A * 4/1992 Reidy ................. B01D 5/0039
                                              210/744
5,884,495 A * 3/1999 Powell ..................... F24F 1/02
                                              62/150
(Continued)

FOREIGN PATENT DOCUMENTS

CN    105271554 A    1/2016
ES       1067560 U    5/2008
(Continued)

*Primary Examiner* — Robert A Hopkins
(74) *Attorney, Agent, or Firm* — Maschoff Brennan (57) ABSTRACT

The present invention relates to a high-efficiency air water system for a tropical climate, including a filtration system, in which an evaporator is provided in an internal accommodating space of a main body, and a condenser is installed in a perforated portion formed passing through a side wall of the main body, so that air cooled in the main body is used to dissipate heat generated in the condenser so as to improve dehumidification efficiency. The configuration of the high-efficiency air water system comprises: an air suctioning unit that suctions and supplies external air; a water generating unit that condenses moisture from the air supplied from the air suctioning unit to generate water; and a water purifying unit that filters and purifies the water generated by the water generating unit to a drinkable or usable state. The water generating unit is constituted by including a main body having an accommodating space provided therein, and an evaporator, a hopper, a water storing part, a condenser, and a compressor are installed in the main body.

3 Claims, 6 Drawing Sheets

(51) Int. Cl.
  *B01D 50/00* (2006.01)
  *F25B 39/02* (2006.01)
  *F24F 6/04* (2006.01)
  *F28B 9/04* (2006.01)
  *F28B 11/00* (2006.01)
  *F25D 19/00* (2006.01)
  *F25B 39/04* (2006.01)
  *F25D 17/06* (2006.01)
  *F24F 6/00* (2006.01)

(52) U.S. Cl.
  CPC .............. *F25B 39/04* (2013.01); *F25D 17/06* (2013.01); *F25D 19/00* (2013.01); *F28B 9/04* (2013.01); *F28B 11/00* (2013.01); *F24F 2006/006* (2013.01)

(56) References Cited

U.S. PATENT DOCUMENTS 8,075,652 B2 * 12/2011 Melikyan ............. B01D 53/265
 55/385.1
2006/0112711 A1 6/2006 Yoon

FOREIGN PATENT DOCUMENTS

| | | |
|---|---|---|
| JP | 08-240324 A | 9/1996 |
| KR | 1998-0009616 | 6/1998 |
| KR | 10-2005-0027843 A | 3/2005 |
| KR | 10-0712194 B1 | 4/2007 |
| KR | 10-2010-0012164 A | 2/2010 |
| KR | 10-2010-0104336 | 10/2010 |
| KR | 10-2013-0022386 A | 3/2013 |
| NL | 1030069 C1 | 12/2005 |

* cited by examiner

HIGH-EFFICIENCY AIR WATER SYSTEM FOR TROPICAL CLIMATE

TECHNICAL FIELD

The present invention relates to a high-efficiency air water system for a tropical climate and more specifically, to a high-efficiency air water system for a tropical climate, which is provided with an evaporator in an accommodation space of a main body thereof, a condenser installed in a perforated portion formed at a side wall of the main body such that air cooled in the main body is used to dissipate heat generated in the condenser thereby making it possible to improve dehumidification efficiency, and a filtration system for filtering substances introduced into a the main body of a water generating unit.

DESCRIPTION OF THE RELATED ART

Water pollution is getting worse due to industrial advances and an increase in pollutants. Against these circumstances, a device for purifying water such as a water purifier is used to purify water, or bottled water in the market is bought for use.

In general, a water purifier is supplied with raw water of the river, the sea etc. and purifies the raw water by filtering harmful substances from the raw water through the process of precipitation, filtering, sterilization etc. using a plurality of filters such that a user can drink the purified water. However, in areas where there is not enough raw water to be purified, a usual water purifier is useless.

According to a theory, relative humidity is lowered when air temperature goes down, and at a temperature where relative humidity is 100% (dew point), an amount of water vapor that exceeds a saturation water vapor amount is condensed and turned into water. On the basis of the theory, a device for purifying, into drinkable water, raw water, obtained through a method in which a refrigerant is circulated so as to cool air, and water vapor in the air is condensed so as to obtain raw water, has been developed.

As a related art, South Korean Patent Laid-Open Publication No. 2005-0027843 and South Korean Patent Laid-Open Publication No. 2010-0104336 disclose a method of condensing moisture in the air through a compressor that sucks external air and compresses a gaseous refrigerant to high temperature and pressure, a condenser that condenses the high-temperature, high-pressure refrigerant gas discharged from the compressor, and an evaporator that evaporates a low-pressure refrigerant passing an expansion tube by way of the condenser so as to generate a certain amount of raw water, and purifying the raw water, thereby making it possible to provide drinkable water. In the method, air is cooled through the circulation of a refrigerant. Thus, a small amount of raw water is generated while a large amount of energy is consumed.

In particular, efficiency in condensation of a condenser has to be improved so as to improve efficiency of an evaporator. However, in tropical areas, external temperature (about 30° C.~40° C.) is too high to effectively condense a refrigerant passing a condenser. As a result, an evaporator fails to function properly.

DETAILED DESCRIPTION OF THE INVENTION

Technical Problems

The present invention is directed to providing an air water system which dissipates heat of a condenser by using air cooled in a main body so as to improve dehumidification efficiency as a technology for evaporating moisture contained in the air and generating water.

Technical Solutions

An air water system of the present invention includes an air suctioning unit 10 for suctioning and supplying external air, a water generating unit 20 for condensing moisture in the air supplied by the air suctioning unit 10 and generating water, and a water purifying unit 30 for filtering and purifying water generated by the water generating unit 20 so as to turn the water into drinkable and usable water, wherein the water generating unit 20 includes a main body 21 having an accommodation space therein, an open upper portion connecting with the air suctioning unit 10, and a perforated portion 21' formed at lateral surface thereof; an evaporator 25 horizontally installed at the upper side inside the main body 21 and cooling external air suctioned through the air suctioning unit 10 to a temperature equal to or below dew point; a hopper 23 formed at the lower portion of the main body 21, supporting water generated by the evaporator 25, and having an outlet 23' on one side thereof so as to discharge water outwards; a water storing part 24 installed at the lower side of the main body 21, and supplied with water discharged through the outlet 23' and collecting the same; a condenser 26 vertically installed at the perforated portion 21' of the main body 21 and having a fan 26' formed at the outer surface thereof so as to discharge cool air in the main body 21 outwards by way of the condenser 26; and a compressor 27 connecting with the evaporator 25 and the condenser 26 and compressing a circulating refrigerant, wherein inlet and outlet refrigerant tubes of the evaporator 25 are provided with dual pressure switches (25A, 25B) that are turned off so as to obtain water by melting frost on a cooling pin of the evaporator 25 when pressure values measured by the pressure sensor 22 are not within the range of set pressure values, wherein the outlet 23' is provided with a U trap 40 so as to prevent a reduction in the amount of air introduced into the main body 21 while blocking air introduced through an outlet from the outside.

Advantageous Effects

An air water system according to the present invention has the advantages of evaporating moisture in the air so as to generate water and turning the water as raw water into drinkable water, and improving efficiency in cooling of air and increasing production of raw water by means of an evaporator and a condenser installed in an accommodating space inside a main body.

BEST MODE FOR CARRYING OUT THE INVENTION

A high-efficiency air water system for a tropical climate according to a preferred embodiment of the present invention will be described in detail with reference to the attached drawings.

A high-efficiency air water system for a tropical climate according to the present invention, as illustrated in FIGS. 1 to 6, includes an air suctioning unit 10, a water generating unit 20, a water purifying unit 30.

Figure 1:
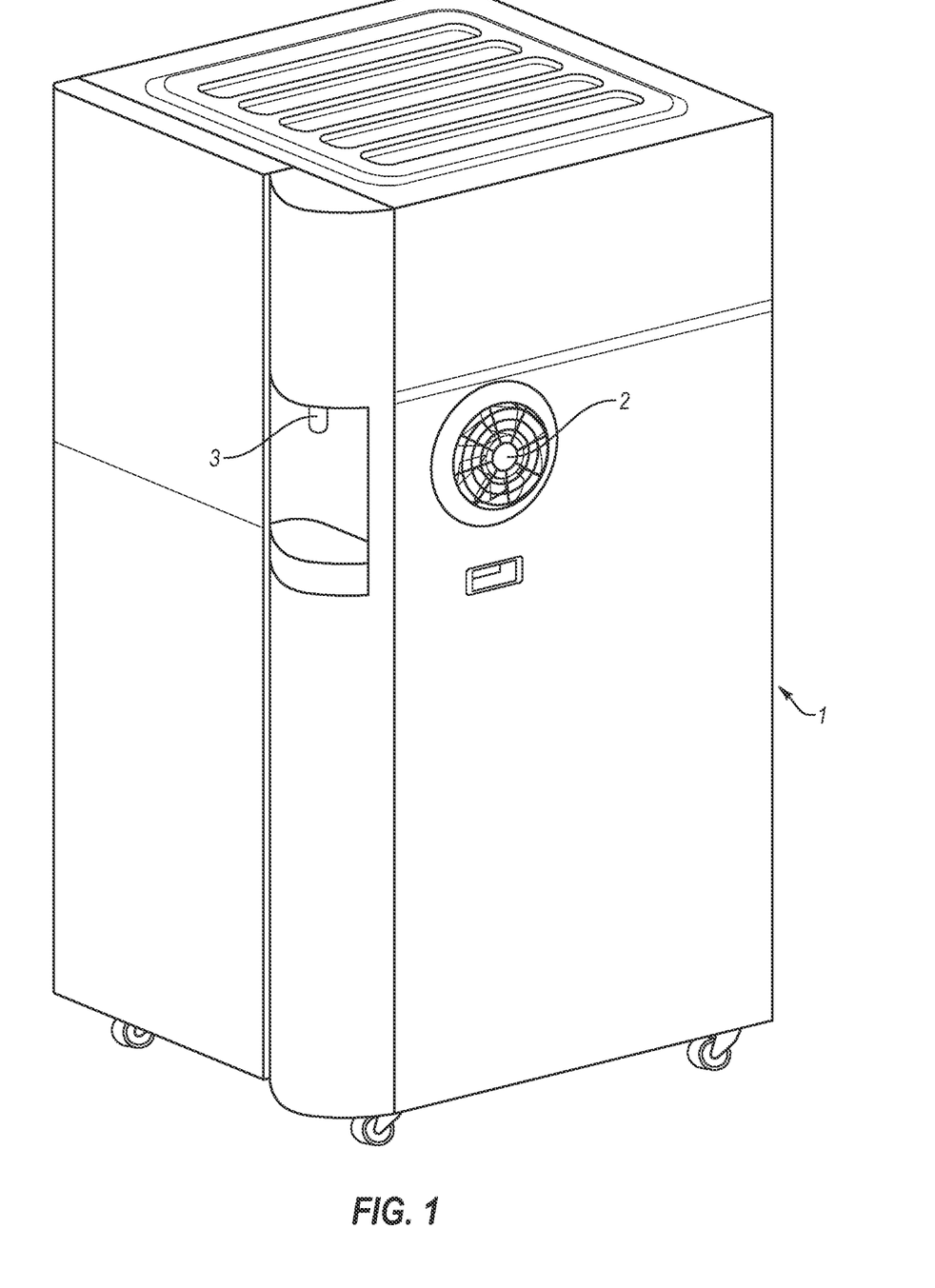
FIG. 1 is a perspective view of an air water system according to the present invention.
Figure 2:
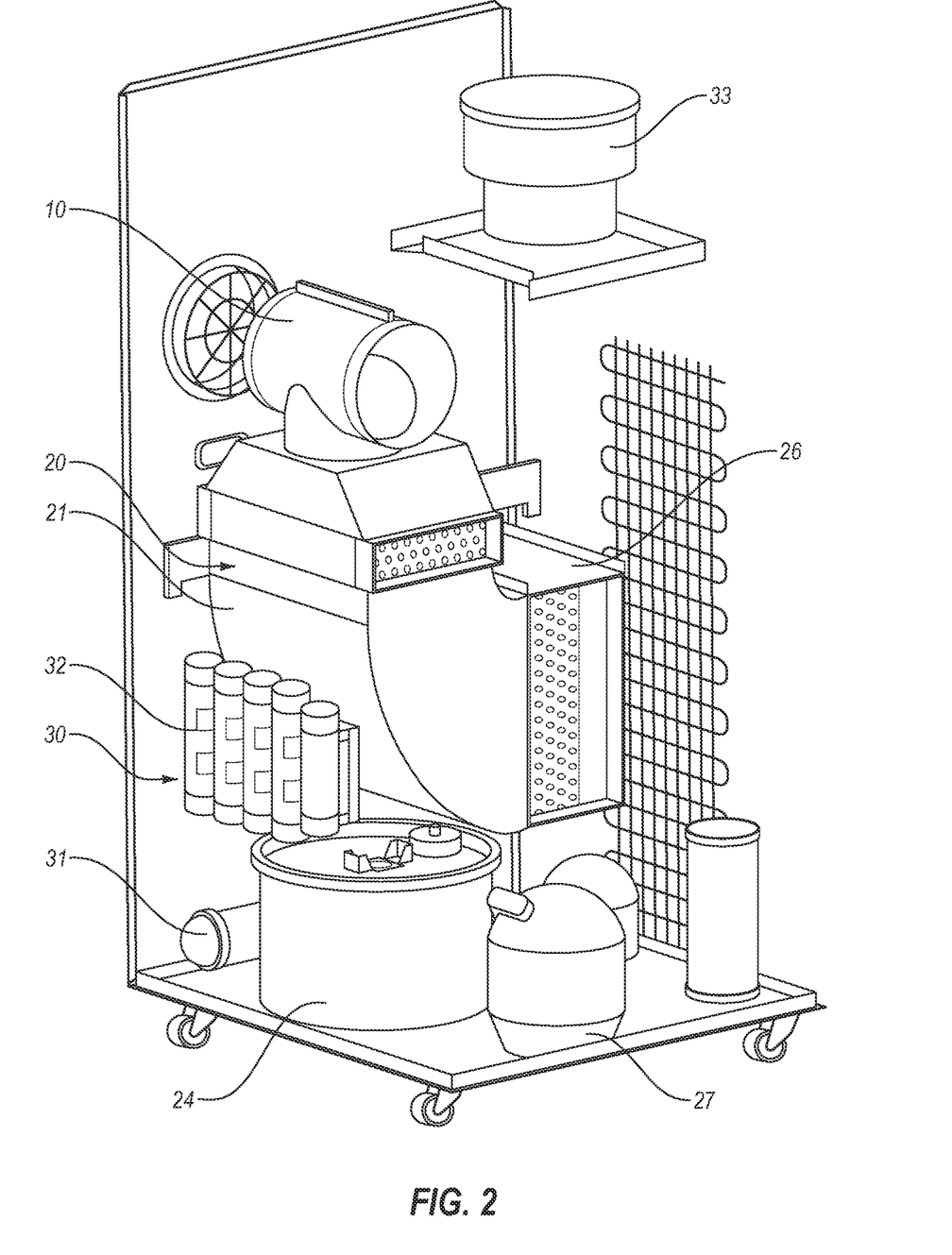
FIG. 2 is a perspective view illustrating the inside of an air water system according to the present invention.

The air suctioning unit 10 allows indoor or outdoor air to be sucked into the water generating unit 20, the air suctioning unit 10, the water generating unit 20, and the water purifying unit 30 are installed inside a case, the case 1 has an air introducing hole 2 that connects with the air suctioning unit 10, and the air introducing hole 2 can connect with a duct (no symbol) so as to selectively input indoor air or outdoor air.

A discharging unit 3 is formed at one side of the case 1 so as to discharge purified water that is drinkable or usable.

In this case, an air filter (invisible) is preferably installed at the air introducing hole 2 so as to remove foreign substances existing in the air sucked into the air introducing hole 2.

Figure 3:
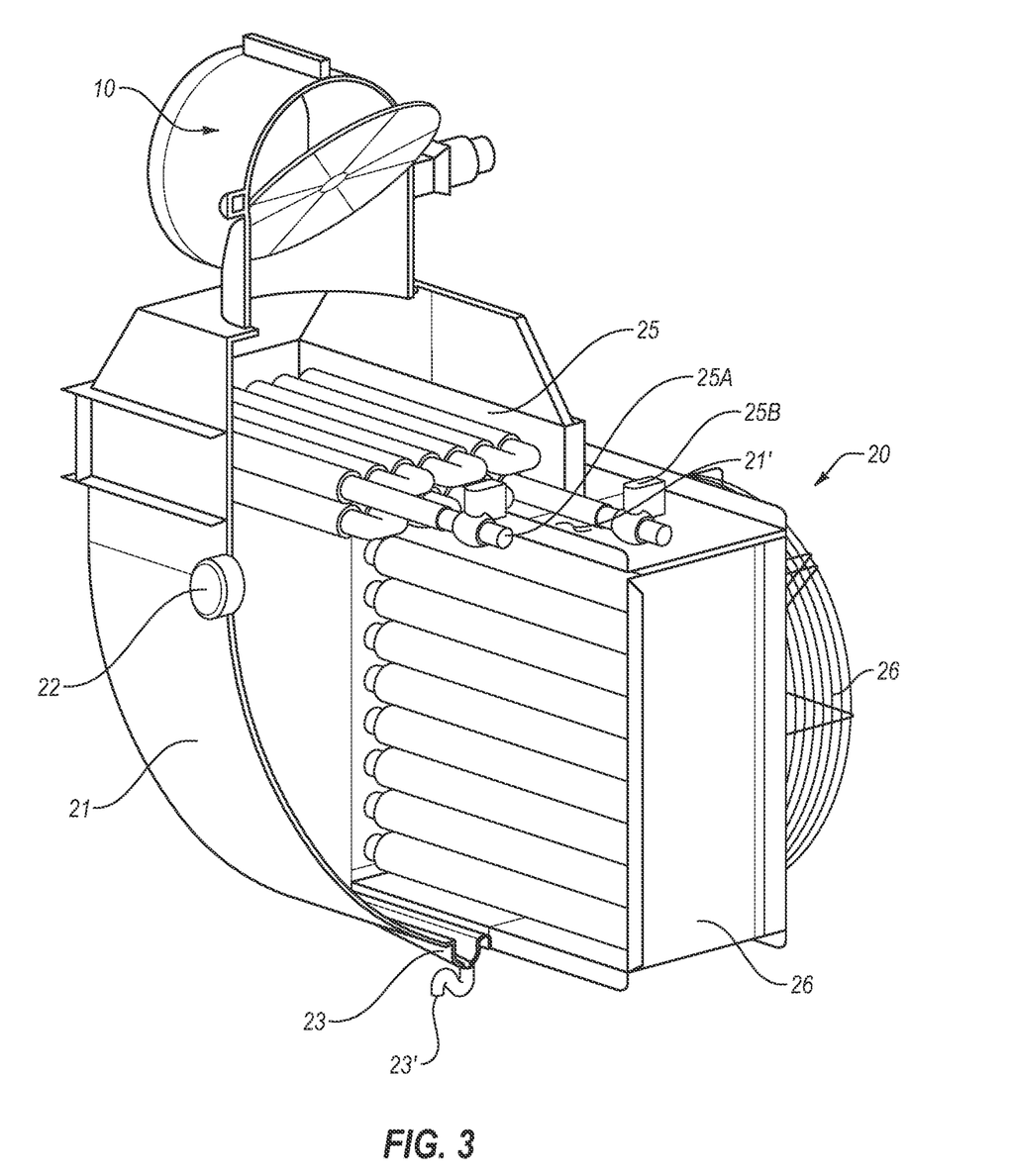
FIG. 3 is a view illustrating the state where a main body according to the present invention is cut.

The water generating unit 20 is coupled to the lower portion of the air suctioning unit 10 so as to generate water from the air supplied through the air suctioning unit 10 and to use the generated water as raw water, and includes a main body 21, a hopper 23, a water string part 24, an evaporator 25, a condenser 26 and a compressor 27.

Herein, the main body 21 has an accommodation space therein and an open upper side, and the open upper side connects with the air suctioning unit 10 such that air is supplied into the main body while the open upper side is closed.

Specifically, the corners of the main body 21 are preferably formed in a curved elbow shape such that water is smoothly led into a hopper and collected in the water storing part 24 through an outlet while the main body 21 allows external air not to be affected by resistance when the external air passes an evaporator 25 and is discharged by way of a condenser 26.

The hopper 23, supporting water generated in the main body 21 and leading the same to be collected in the water storing part 24, is provided at the lower portion of the main body 21 and has an outlet 2' formed at the lower portion of one side of the main body so as to discharge generated water.

In this case, the outlet 23' preferably has a U trap 40 so as to prevent a reduction in the amount of air introduced into the main body 21 while blocking air introduced through the outlet from the outside.

As a result, the amount of air introduced into the main body is maintained, and water is continuously generated without a reduction in the production of water.

The evaporator 25 is configured to cool air supplied into the main body 21 by the air suctioning unit 10 at temperature equal or below the dew point, the condenser 26 is configured to convert a high-temperature gaseous refrigerant containing heat taken from the evaporator 25 into a low-temperature chilled liquid refrigerant, and the compressor 27 is configured to connect with the evaporator 25 and the condenser 26 and compress a circulating gaseous refrigerant to high temperature and pressure. The well-known freezing cycle is applied to the evaporator, condenser, and compressor.

In this case, the evaporator 25 of the present invention is parallelly installed on the upper side of the main body 21, and the condenser 26 is vertically installed at a perforated portion 21' formed on the lateral surface of the main body 21 and is configured to discharge cold air inside the main body 21 outwards by way of the condenser 26 by means of a fan 26' installed at the condenser 26.

By doing so, the cold air inside the main body 21 cools the condenser 26 so as to improve efficiency in heat dissipation of the condenser thereby improving efficiency in evaporation of the evaporator.

In tropical regions, external air is too hot to smoothly cool a condenser. Thus, condensation efficiency is low. According to the present invention, cold air inside the main body goes through a condenser so as to allow the condenser to dissipate heat thereby improving efficiency in condensation.

Figure 4:
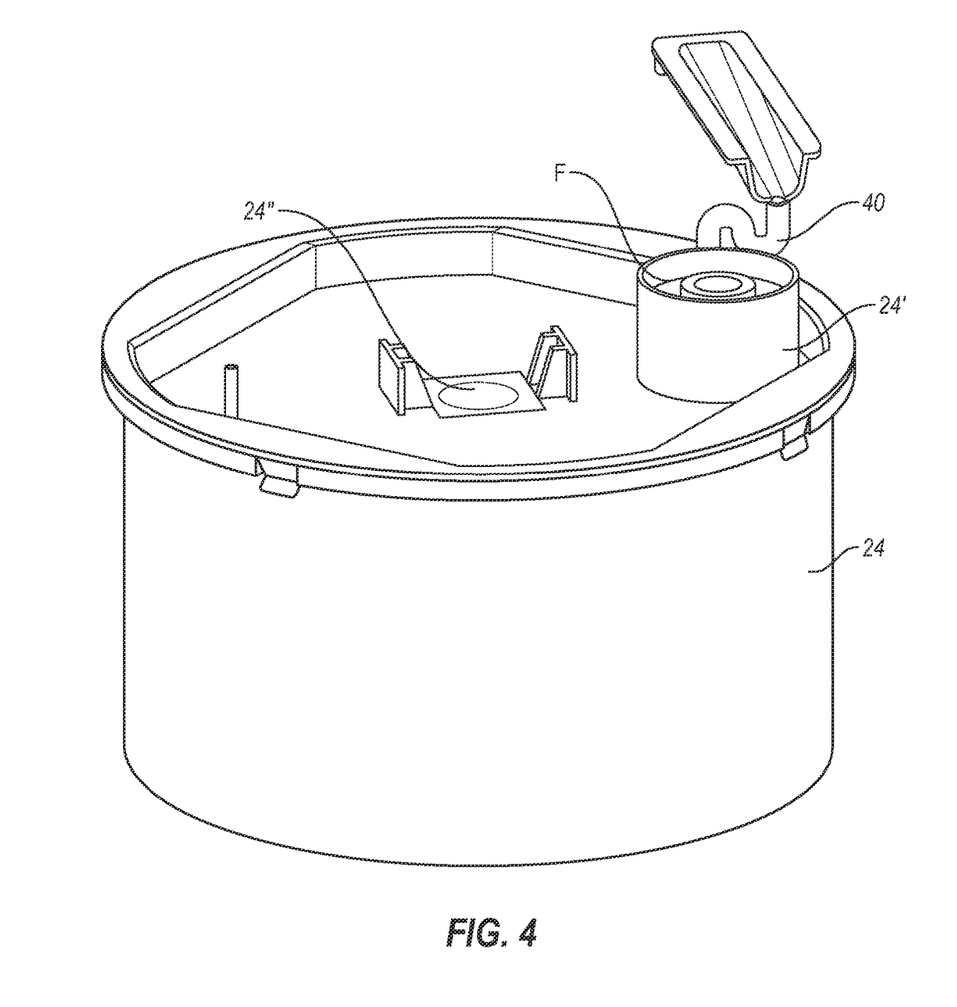
FIG. 4 is a perspective view illustrating a water storing part according to the present invention.
Figure 5:
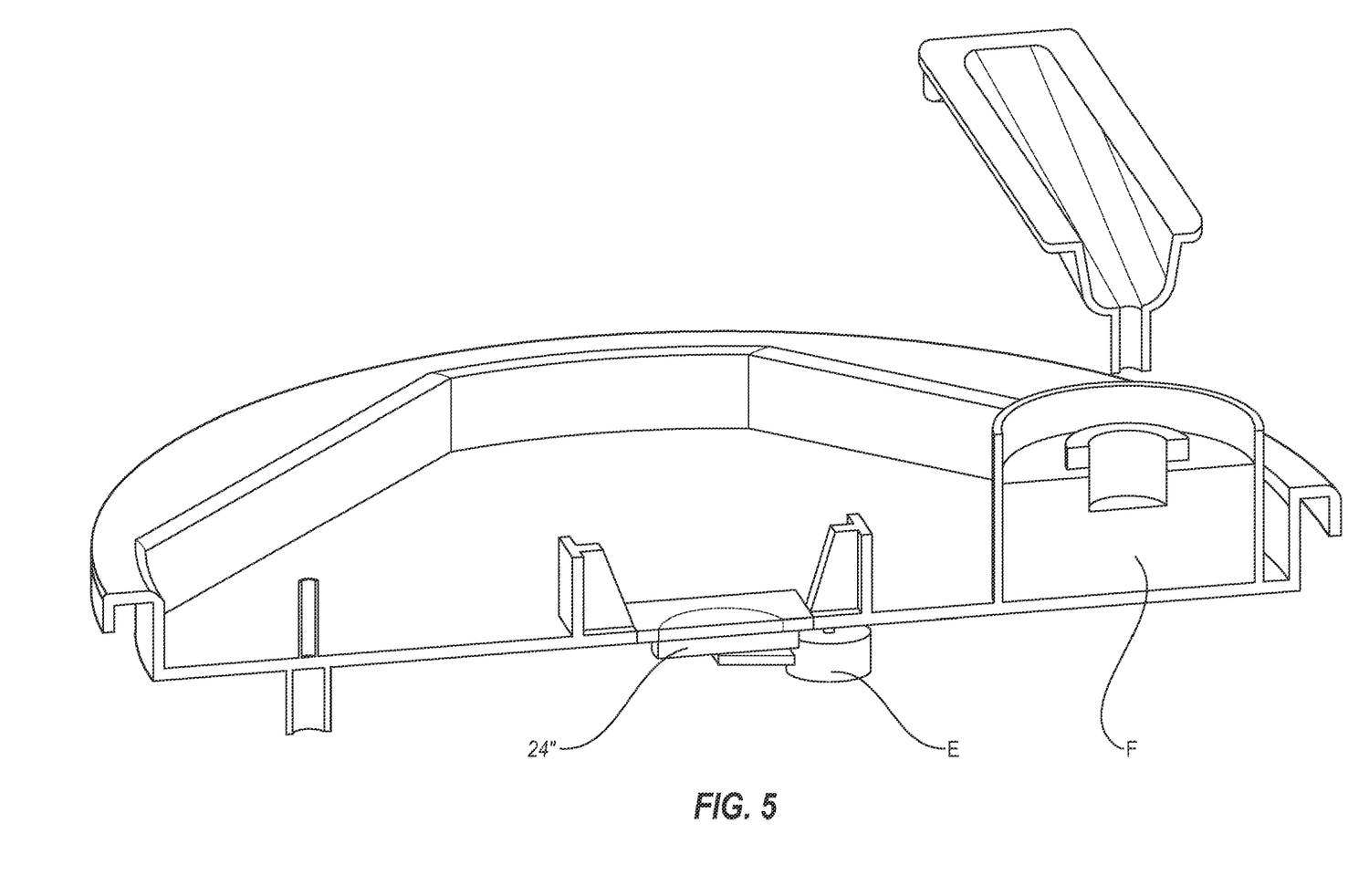
FIG. 5 is a view illustrating a cross section of the upper portion of a water storing part according to the present invention.

The water storing part 24 has a water introducing part 24' formed at the upper portion thereof so as to introduce water discharged from the outlet 23', and the water introducing part 24' is provided with a filtration net F so as to filter the introduced water, a water introducing groove 24" formed on the upper surface thereof so as to introduce overflown water if water cannot go through the filtration net and is overflown because foreign substances are accumulated in the filtration net, and a sensor E do as to sense water introduced into the water introducing groove.

Preferably, an alarm etc. is used to notify to a user that the sensor E senses water thereby making the user wash the filtration net.

Meanwhile, inlet and outlet refrigerant tubes of the evaporator 25 of the present invention are provided with dual pressure switches (25A, 25B) so as to obtain water by stopping the freezing cycle and melting frost on a cooling pin of the evaporator 25.

The dual pressure switches operate regularly at a set time, or operate according to pressure values if a pressure sensor that will be described hereunder is installed so as to operate or stop the freezing cycle. When frost is piled on a cooling pin of the evaporator, the dual pressure switches stop the freezing cycle so as to melt the frost and to generate water, and when the frost is melted, the dual pressure switches operate the freezing cycle so as to accumulate frost on the cooling pin of the evaporator.

South Korean Patent Laid-Open Publication No. 1998-0009616 discloses such dual pressure switches. Thus, the detailed structure of the dual pressure switches will not be described.

The water purifying unit 30 is installed on one side of the water storing part 24 in which water generated by the water generating unit 20 is collected, and configured to filter and purify water supplied by a supply pump 31 with a plurality of filters 32 so as to convert the water into drinkable and usable water. Purified water that has passed the filters 32 is stored in a water tank 33 such that a user drinks or uses the water stored in the water tank by discharging the same.

In this case, although it is not illustrated, the water stored in the water tank 33 can be discharged in the state of being heated or cooled depending on a user's needs.

Meanwhile, a discharging unit that discharges warm air according to the operation of the freezing cycle is formed on the rear surface of the case 1 of the present invention.

An operation of an air water system with the above-described configuration according to the first embodiment of the present invention will be described.

Sucked air is introduced into a main body 21 according to the operation of an air suctioning unit 10. Air sucked into the main body 21 passes an evaporator, and moisture in the air is removed such that water is generated.

Specifically, air supplied into a main body 21 passes an evaporator 25, heat is taken from the air, and the air is cooled. By doing so, the inside of the main body 21 is cooled at temperature equal to or below the dew point, and moisture in the air introduced into the main body 21 is turned into a solid and attached to a cooling pin of the evaporator.

As described above, when frost is accumulated on the cooling pin of the evaporator, the operation of the freezing cycle stops, and the frost attached to the cooling pin is melted and defrosted such that water is generated.

In order to stop the operation of the freezing cycle, a timer (invisible) or a temperature sensor etc. is regularly turned on and off. By doing so, moisture in the air is turned into a solid like frost while passing the evaporator 25, and then melted and turned into a liquid such that water is generated.

In this case, power regularly supplied to the evaporator is supplied or blocked such that water can be generated. Thus, the evaporator doesn't have to operate continuously. This leads to a reduction in costs of cooling air and an increase in the life span of the freezing cycle.

The generated water passes a hopper 23 and is collected in a water storing part 24 through an outlet 23'. The water collected in the water storing part 24 is pumped by a supply pump 31, passes a plurality of filters 32 so as to be filtered and purified, and then is stored in a water tank 33. The water stored in the water tank is supplied through a discharge cock to a user in the state of being heated or cooled.

Figure 6:
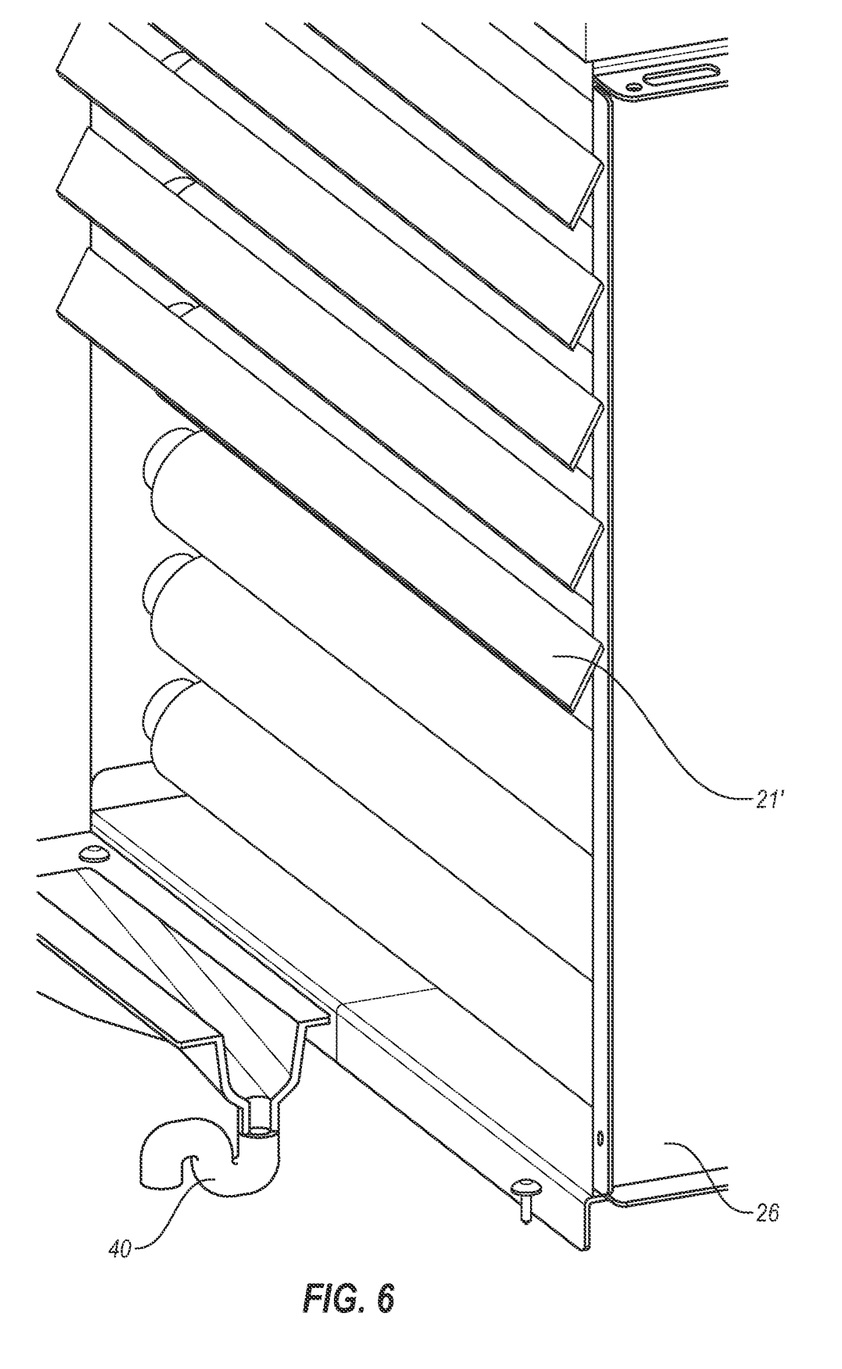
FIG. 6 is a view illustrating the state where a blade is installed at the front of a condenser according to the present invention.

Herein, a perforated portion 21' has a plurality of blades 21" so as to prevent water falling from the cooling pin of the evaporator 25 from being introduced into a condenser 26.

Meanwhile, a pressure sensor 22 can be installed on one side wall of the main body 21.
The pressure sensor 22 is configured to measure pressure inside the main body 21, and the operation of the freezing cycle stops only when frost is accumulated relatively high through measurement of pressure inside the main body using the pressure sensor not through a regular stop of the operation of the freezing cycle using the timer.

That is, if frost is continuously accumulated on the cooling pin, the frost blocks the inlet. Thus, external air is not introduced into the main body 21, pressure inside the main body increases. In this case, the pressure sensor measures the increased pressure.

When the measured pressure values exceed set pressure values, the pressure sensor blocks power supplied to the freezing cycle so as to stop the freezing cycle, melts and removes frost in a solid state while operating the fan, thereby making it possible to generate water.

The invention claimed is:

1. A high-efficiency air water system for a tropical climate comprising:
    an air suctioning unit for suctioning and supplying external air, a water generating unit for condensing moisture in the air supplied by the air suctioning unit and generating water, and a water purifying unit for filtering and purifying water generated by the water generating unit so as to turn the water into drinkable and usable water, the water generating unit comprising:
    a main body having an accommodation space therein, an open upper side connecting with the air suctioning unit, and a perforated portion formed at a lateral surface thereof;
    an evaporator horizontally installed at the upper side inside the main body and cooling external air suctioned through the air suctioning unit to a temperature equal to or below dew point;
    a hopper formed at the lower portion of the main body, supporting water generated by the evaporator, and having an outlet on one side thereof so as to discharge water outwards;
    a water storing part installed at the lower side of the main body, and supplied with water discharged through the outlet and collecting the same;
    a condenser vertically installed at the perforated portion of the main body and having a fan formed at the outer surface thereof so as to discharge cool air in the main body outwards; and
    a compressor connecting with the evaporator and the condenser and compressing a circulating refrigerant,
    wherein:
        inlet and outlet refrigerant tubes of the evaporator are provided with dual pressure switches that are turned off so as to obtain water by melting frost on a cooling pin of the evaporator when pressure values measured by a pressure sensor are not within a range of set pressure values, and
        the outlet is provided with a U trap so as to prevent a reduction in the amount of air introduced into the main body while blocking air introduced through an outlet from the outside.

2. The high-efficiency air water system for a tropical climate according to claim 1,
    wherein the perforated portion is provided with a plurality of blades so as to prevent water, which falls while frost on the cooling pin of the evaporator is melted, from being introduced into the condenser.

3. The high-efficiency air water system for a tropical climate according to claim 1,
    wherein the main body is provided with a pressure sensor installed on one side wall thereof so as to measure inner pressure and to control the operation of a freezing cycle.

* * * * *